US009705308B2

(12) United States Patent
Lee et al.

(10) Patent No.: US 9,705,308 B2
(45) Date of Patent: Jul. 11, 2017

(54) POWER STRIP, POWER PLUG, AND POWER OUTLET

(71) Applicant: POWERTECH INDUSTRIAL CO., LTD., New Taipei (TW)

(72) Inventors: Yu-Lung Lee, New Taipei (TW); Chi Feng Cheng, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 450 days.

(21) Appl. No.: 14/330,053

(22) Filed: Jul. 14, 2014

(65) Prior Publication Data

US 2015/0311698 A1  Oct. 29, 2015

(30) Foreign Application Priority Data

Apr. 23, 2014  (TW) .............................. 103114679 A

(51) Int. Cl.
| | |
|---|---|
| *H01R 25/00* | (2006.01) |
| *H02H 5/04* | (2006.01) |
| *H01R 13/713* | (2006.01) |

(52) U.S. Cl.
CPC ........... *H02H 5/04* (2013.01); *H01R 13/7137* (2013.01); *H01R 25/003* (2013.01)

(58) Field of Classification Search
None
See application file for complete search history.

(56) References Cited

U.S. PATENT DOCUMENTS

| | | | | |
|---|---|---|---|---|
| 2008/0265677 | A1* | 10/2008 | Chiang | H01R 13/6683 307/38 |
| 2011/0134575 | A1* | 6/2011 | Ward | G01K 3/005 361/42 |
| 2014/0073189 | A1* | 3/2014 | Kondou | H01R 13/6683 439/620.21 |
| 2015/0171646 | A1* | 6/2015 | Pham | H02J 7/0029 320/109 |

\* cited by examiner

*Primary Examiner* — Jared Fureman
*Assistant Examiner* — Aqeel Bukhari
(74) *Attorney, Agent, or Firm* — Li & Cai Intellectual Property (USA) Office

(57) ABSTRACT

A power strip includes a power plug and an outlet connected to the power plug through a power cord. The power plug has a plugging face and at least one power pin disposed on the plugging face. The power plug includes a first thermal cut-off device, which has a first thermal sensing pin exposed on the plugging face. The outlet has at least one set of apertures. The first thermal cut-off device is in electrically connection with a power output wire of the power plug. The first thermal cut-off device cuts off the power transmission between the power plug and the outlet when the temperature of the plugging face exceeds a first determined temperature.

8 Claims, 5 Drawing Sheets

POWER STRIP, POWER PLUG, AND POWER OUTLET

BACKGROUND

1. Field of the Invention

The instant disclosure relates to power strip, and pertains particularly to a power strip having thermal cut-off device.

2. Description of Related Art

When a power plug is in use, heat is easily accumulated at conductive pins of the power plug because of the overload, which may cause fire. The insulating body of the power plug can be easily deformed or degraded due to the generated heat, which may even cause the relative position between the conductive pins to change, thereby resulting the abnormal plugging between the power plug and the outlet where the power plug is plugged to.

There have been an increasing number of electrical appliances used in our daily life. The electrical appliances are each provided with a plug to connect to the electric power source, resulting in an insufficient number of the user's home outlets. Thus, a power strip is used to increase the number of outlets.

SUMMARY OF THE INVENTION

The embodiment of the instant disclosure provides a power strip. The power strip comprises a power plug and an outlet, which is connected to the power plug through a power cord. The power plug has a plugging face and at least one power pin disposed on the plugging face. In addition, the power plug comprises a first thermal cut-off device disposed therein. The first thermal cut-off device has a first thermal sensing pin exposed on the plugging face. The first thermal cut-off device is in electrical connection with a power output wire of the power plug. When the temperature of the plugging face exceeds a first determined temperature, the first thermal cut-off device cuts off the power transmission between the power plug and the outlet.

Another aspect of the instant disclosure provides a power plug. The power plug comprises a main body and a thermal cut-off device disposed inside the main body. The main body has a plugging face and at least one power pin disposed on the plugging face. The thermal cut-off device has a thermal sensing pin exposed on the plugging face. Furthermore, the thermal cut-off device is electrically connected between the power pin and a power output wire of the power plug. When the temperature of the plugging face exceeds a determined temperature, the thermal cut-off device cuts off the power transmission between the power pin and the power output wire.

Another aspect of the instant disclosure provides an outlet, which is adapted for a power strip having a power plug. The outlet comprises a main body and a thermal cut-off device disposed inside the main body. The main body has at least one set of apertures and the main body is connected to the power plug through a power cord, where the outlet has at least one conductive sheet disposed inside the main body. The thermal cut-off device is electrically connected between the conductive sheet and a power input wire. In addition, the thermal cut-off device has a thermal sensing pin, which is in contact with the conductive sheet. When the temperature of the conductive sheet exceeds a determined temperature, the thermal cut-off device cuts off the power transmission between the conductive sheet and the power input wire.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. the invention itself, however, as well as a preferred mode of use, further objectives and advantages thereof, will best be understood by reference to the following detailed description of an illustrative embodiments when read in conjunction with the accompanying drawings, wherein:

DETAILED DESCRIPTION OF THE PREFERRED EMBODIMENTS

The instant disclosure will be described more specifically with reference to the following embodiments. It is to be noted that the following descriptions of preferred embodiments are provided herein for purpose of illustration and description. It is not intended to be exhaustive or limiting to the precise form disclosed.

Figure 1:
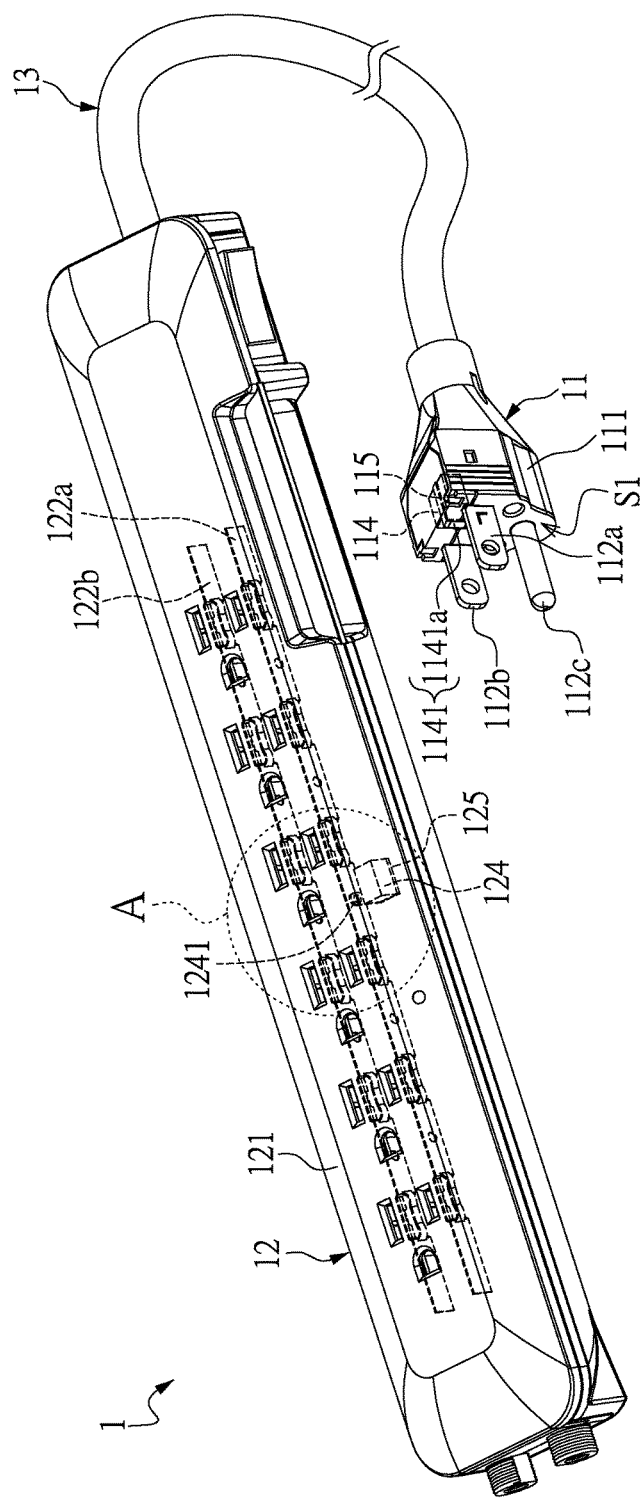
FIG. 1 illustrates a perspective view of a power strip in accordance with an embodiment of the instant disclosure.
Figure 4:
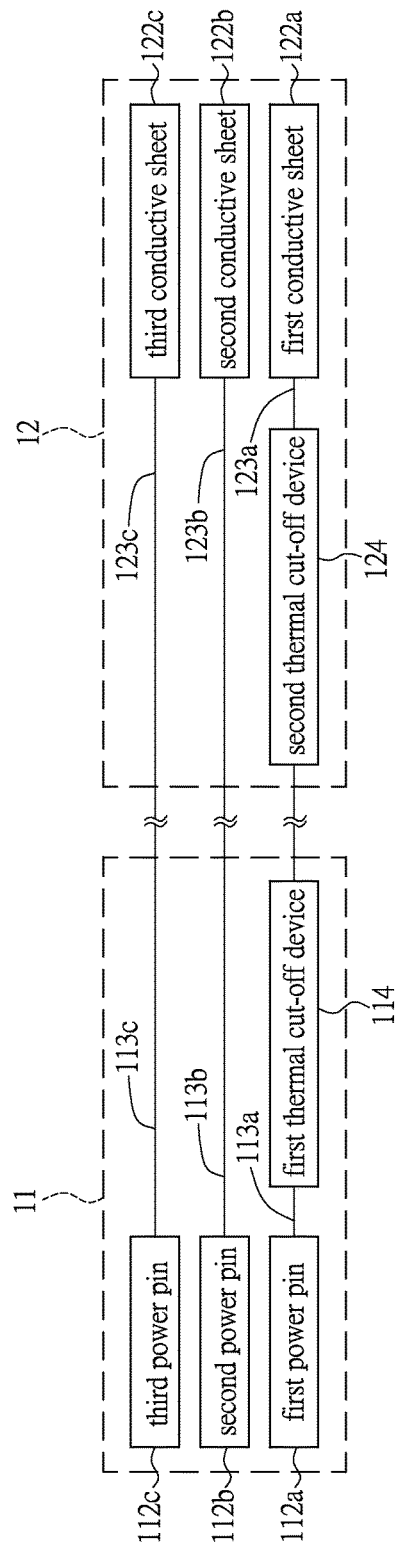
FIG. 4 illustrates a schematic circuit block diagram of the power strip as shown in FIG. 1.

Please refer concurrently to FIG. 1 and FIG. 4. FIG. 1 illustrates a perspective view of a power strip in accordance with an embodiment of the instant disclosure. FIG. 4 illustrates a schematic circuit block diagram of the power strip as shown in FIG. 1. The power strip 1 comprises a power plug 11, an outlet 12, and a power cord 13, where the outlet 12 is connected to the power plug 11 through the power cord 13.

Figure 2:
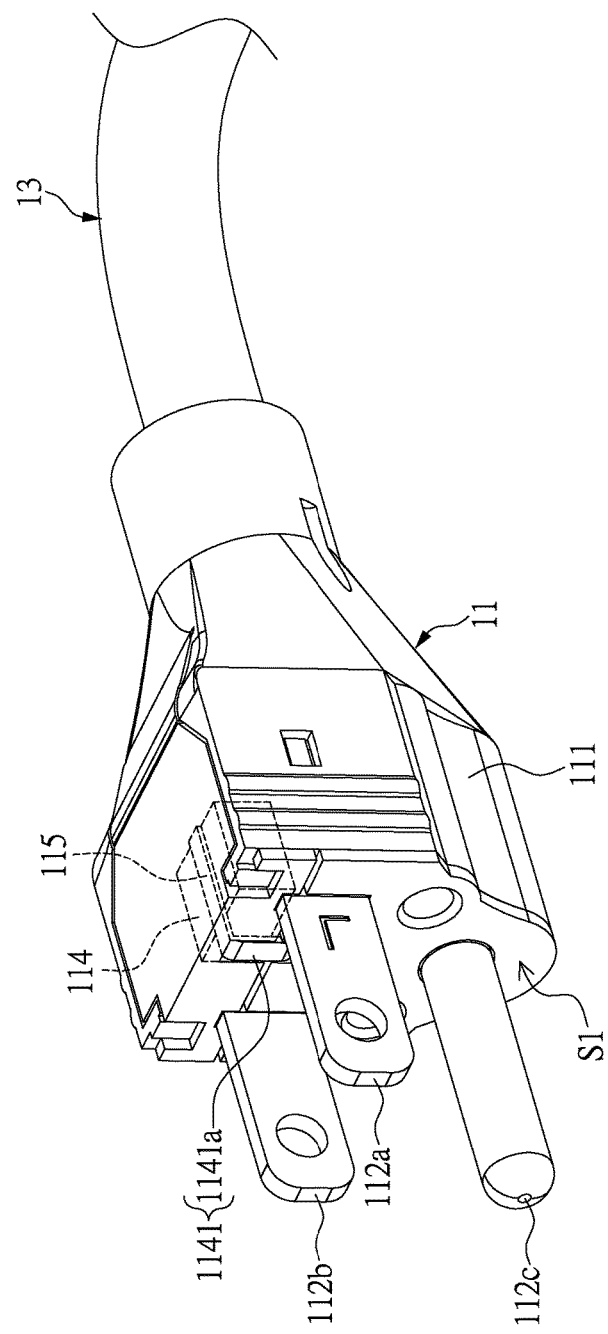
FIG. 2 illustrates a perspective view of a power plug adapted for the power strip as shown in FIG. 1.
Figure 5:
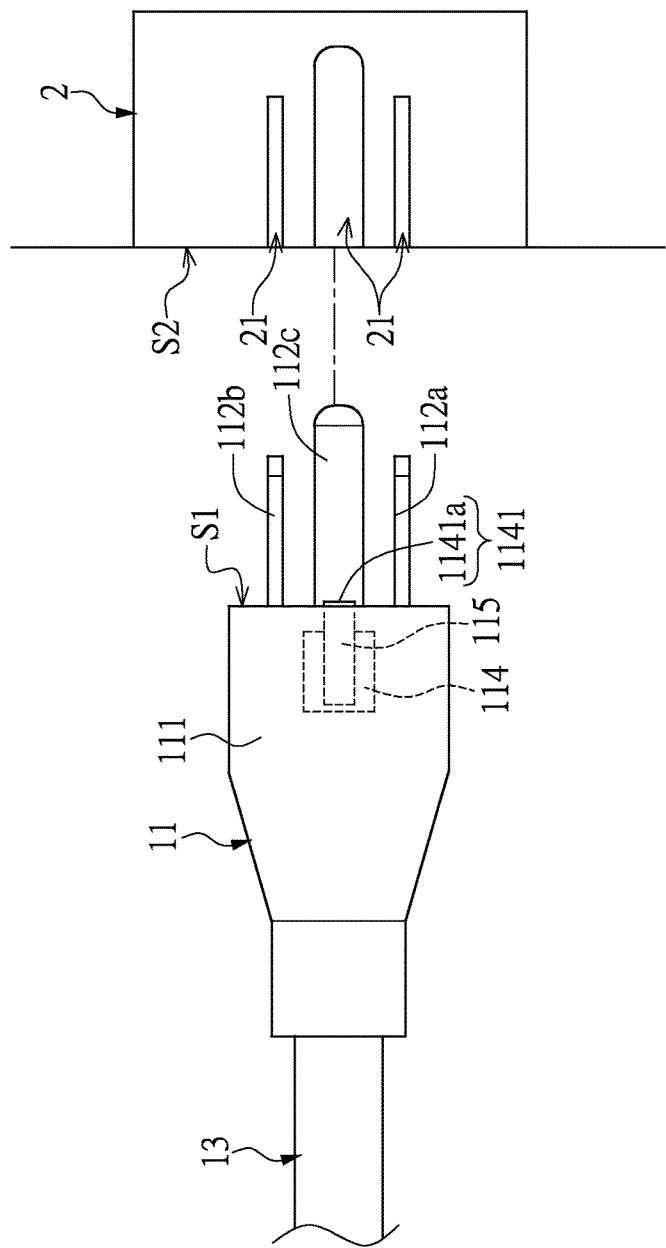
FIG. 5 shows the power plug adapted for the power strip as shown in FIG. 1 plugging into an external outlet in accordance with an embodiment of the instant disclosure.

Please refer concurrently to FIG. 1, FIG. 2, and FIG. 5. FIG. 2 illustrates a perspective view of a power plug adapted for the power strip as shown in FIG. 1. FIG. 5 shows the power plug adapted for the power strip as shown in FIG. 1 plugging into an external outlet in accordance with an embodiment of the instant disclosure. The power plug 12 is for being plugged to an external outlet 2 (FIG. 5), such as an alternating-current power (referred to as the AC power) supply outlet, for receiving AC power. The power plug 11 includes a main body 111, at least one power pin, and a first thermal cut-off device 114. In the instant exemplary disclosure, the power plug 11 includes three power pins, which are a first power pin 112a, a second power pin 112b, and a third power pin 112c. The external outlet 2 can be, for example, an in-wall socket which has a wiring box (not shown in the Figures) and a plurality of apertures 21.

The main body 111 of the power plug 11 has a plugging face S1. When the power plug 11 is plugged to the external outlet 2, the plugging face S1 can be in fully contact with the surface S2 of the external outlet 2. The power pins 112a, 112b, and 112c, which are a live pin, a neutral pin, and an earthing pin, are allowed to be removably plugged into the apertures 21 of the external outlet 2. As shown in FIG. 1, the power pins 112a, 112b, and 112c are disposed on the plugging face S1 and protruding from the plugging face S1. Moreover, as shown in FIG. 4, the power pins 112a, 112b, and 112c are electrically connected to a first power output wire 113a, a second power output wire 113b, and a third power output wire 113c respectively.

Specifically, the main body 111 of the power plug 11 may included an insulating molding and an inner frame disposed in the insulating molding (not shown in the Figures). The insulating molding is formed of electrically insulating, thermal insulating, and fire-retardant material. The inner frame is for fixing the power pins 112a, 112b, and 112c, and the power pins 112a, 112b, and 112c are electrically connected to the power output wires 113a, 113b, and 113c respectively through conductive terminals (not shown in the Figures) of the inner frame.

The first thermal cut-off device 114 is disposed inside the main body 111 of the power plug 11 and electrically connected between the first power output wire 113a and the first power pin 112a. The first thermal cut-off device 114 has a first thermal sensing pin 1141, where a first end 1141a of the first thermal sensing pin 1141 is exposed on the plugging face S1 for sensing the temperature of the plugging face S1. When the temperature of the plugging face S1 exceeds a first determined temperature, the first thermal cut-off device 114 cuts off the power transmission between the first power pin 112a and the first power output wire 113a, whereby the power transmission between the power plug 11 and the outlet 12 is cut off.

To put it concretely, the first thermal cut-off device 114, as a specific example, may have a switching unit electrically connected to a power input terminal of the first thermal cut-off device. When the temperature sensed by the first thermal sensing pin 1141 exceeds the first determined temperature (such as 80 Celsius degrees), the switching unit and the power input terminal of the first thermal cut-off device 114 become electrically disconnected such that the power transmission between the first power pin 112a and the first power output wire 113a is cut off, where the temperature of the plugging face S1 which exceeds the first determined temperature may be caused by the accumulated heat resulting from the abnormal plugging between the power plug 11 and the external outlet 2 or from the overload of the power plug 11 or the external outlet 2. Thus, the abnormal condition, such as shorts and fires or melting of the power plug 11 or the external outlet 2, resulting from the accumulated heat can be avoided.

In another exemplary embodiment, the first thermal cut-off device 114 may have a thermal fuse electrically connected between the first thermal sensing pin 1141 and the first power output wire 113a in serial. In an alternatively embodiment, the first thermal cut-off device 114 may have a temperature signal processing circuit. Moreover, the first thermal cut-off device 114 can communicate the power transmission between the power plug 11 and the outlet 12 when the temperature of the plugging face S1 is back below the first determined temperature. The design of the first thermal cut-off device 114 can vary according to needs, and the instant disclosure is not limited thereto.

In the instant disclosure, the first end 1141a of the first thermal sensing pin 1141 is flush with the plugging face S1. Therefore, when the power plug 11 is plugged to the external outlet 2, where the plugging face S1 can be in contact with the surface S2 of the external outlet 2, the first end 1141a can be fully contact with the surface S2 of the external outlet 2 for sensing the temperature of the surface S2. When the temperature of the surface S2 of the external outlet 2 exceeds the first determined temperature, the first thermal cut-off device 114 also can cut off the power transmission between the power plug 11 and the outlet 12. It is worth noting that, in an alternative embodiment, the plugging face S1 is not necessarily in contact with the surface S2 of the external outlet 2 when the power plug 11 is plugged to the external outlet 2. For example, the first end 1141a of the first thermal sensing pin 1141 can protrude from the plugging face S1. The dimension of the first end 1141a protruding from the plugging face S1 varies according to needs, and the first end 1141a protruding from the plugging face S1 may not hinder the power plug 11 from being plugged to the external outlet 2.

In another exemplary embodiment, the external outlet 2 can have a socket panel (not shown in the Figures) surrounding the set of the apertures 21. The accumulated heat resulting from the abnormal plugging or from the overloading can be transferred to the socket panel. When the power plug 11 is plugged to the external outlet 2, the first thermal sensing pin 1141 of the power plug 11 can be in contact with the socket panel for sensing the temperature of the socket panel. The first thermal cut-off device 114 cuts off the power transmission between the power plug 11 and the outlet 12 when the temperature of the socket panel exceeds the first determined temperature. In another embodiment, the external outlet 2 can be an outlet of a power strip.

Structurally, the first thermal cut-off device 114 is disposed onto the inner frame of the power plug 11 through a first conductive guide 115. Specifically, the edge of the first conductive guide 115 can be formed of a recess for accommodating the first thermal cut-off device 114. Or, the first conductive guide 115 can be formed of a thermal conductive holder. The conductive guide 115 can be thermal coupled to the first thermal sensing pin 1141 by soldering or adhesion through thermal glue for conducting the heat.

It is worth mentioning that, the first conductive guide 115 and the first thermal sensing pin 1141 can be one piece and formed by single-stage or multi-stage stamping process. For example, in the stamping process, a planner initial plate provided is cut and deformed by bending, punching, piercing or blanking, whereby a three-dimensional shape is formed. The one-piece formed structure is hung onto the inner rack of the main body 111 through the first conductive guide 115 that has a bending shape. In another embodiment, the first conductive guide 115 can have a latching portion, such that the first conductive guide 115 can be easily detached from the inner rack of the main body 111 for repair and maintain.

Figure 3:
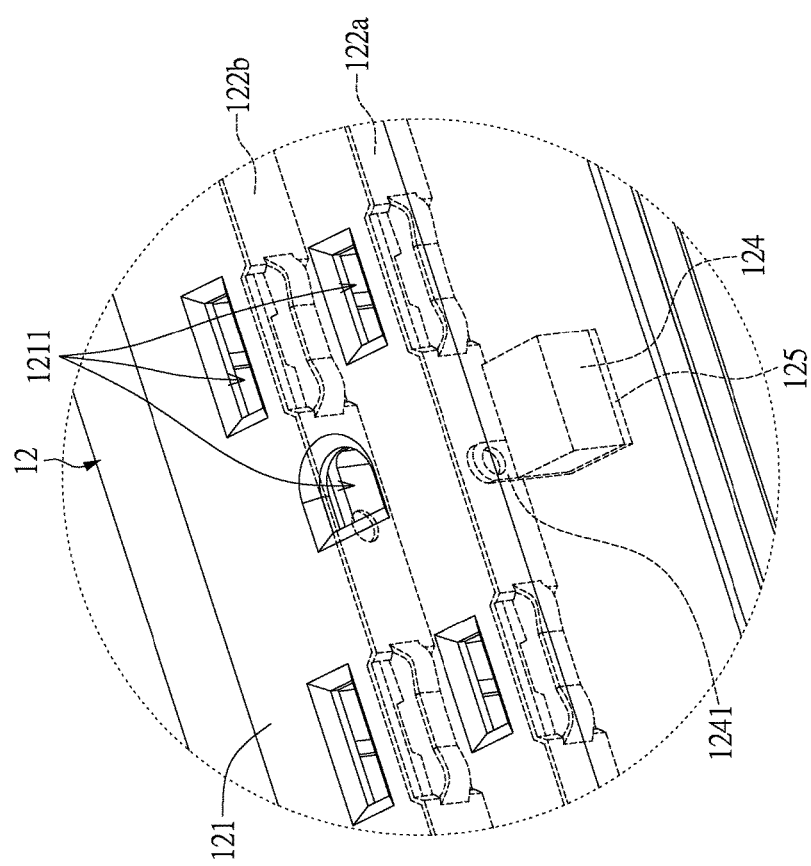
FIG. 3 illustrates a partial perspective view of an outlet adapted for the power strip as shown in FIG. 1.

Please refer concurrently to FIG. 1, FIG. 3, and FIG. 4. FIG. 3 illustrates a partial perspective view of an outlet adapted for the power strip as shown in FIG. 1. FIG. 3 illustrates a partial perspective view in accordance with the portion A shown in FIG. 1. The outlet 12 comprises a main body 121, at least one conductive sheet, and a second thermal cut-off device 124. In the instant exemplary disclosure, the outlet 12 includes three conductive sheets, which are a first conductive sheet 122a, a second conductive sheet 122b, and a third conductive sheet 122c.

The outlet 12 has at least one set of apertures and is connected to the power plug 11 through the power cord 13. As shown in FIG. 3, each set of the apertures includes three apertures 1211. The conductive sheets 122a, 122b, and 122c are corresponding to the apertures 1211 respectively in position. As shown in FIG. 4, the conductive sheets 122a, 122b, and 122c are electrically connected to a first power input wire 123a, a second power input wire 123b, and a third power input wire 123c respectively, and are electrically connected to the power output wires 113a, 113b, and 113c through the power cord 13 respectively.

The outlet 12 serves as an interface for supplying power. For example, when the outlet is providing AC power, a plug of an electronic appliance (not shown in the Figures) can be selectively plugged to one of the sets of the apertures 1211 of the outlet 12 to be electrically connected to the conductive sheets 122a, 122b, and 122c, whereby the electronic appliance can be supplied with the AC power.

The second thermal cut-off device 124 is disposed inside the main body 121 of the outlet 12 and electrically connected between the first power input wire 123a and the first conductive sheet 122a. The second thermal cut-off device 124 has a second thermal sensing pin 1241, which is in contact with the first conductive sheet 122a for sensing the temperature of the first conductive sheet 122a. As shown in FIG. 3, the second thermal cut-off device 124 is disposed onto the first conductive sheet 122a through a second conductive guide 125 inside the main body 121 of the outlet 12. The second conductive guide 125 is, as a specific example, a thermal conductive holder for accommodating the second thermal cut-off device 124. The second conductive guide 125 can be thermally coupled to the second thermal sensing pin 1241 for conducting the heat. Moreover, the second conductive guide 125 can be removably fixed to the first conductive sheet 122a by screwing, thus the second conductive guide 125 and the second thermal cut-off device 124 disposed thereon can be easily detached from the first conductive sheet 122a for repair and maintain.

When the temperature of the first conductive sheet 122a exceeds a second determined temperature, the second thermal cut-off device 124 cuts off the power transmission between the first conductive sheet 122a and the first power input wire 123a. In an exemplary embodiment, the second thermal cut-off device 124 may have a temperature signal processing circuit (not shown in the Figures). When the temperature sensed by the second thermal sensing pin 1241 exceeds the second determined temperature (such as 80 to 100 Celsius degrees), the temperature signal processing circuit can generate a control signal to a switching unit (not shown in the Figures) of the second thermal cut-off device 124, thus the second thermal cut-off device 124 can cut off the power supplying to the first conductive sheet 122a through the switching unit, whereby the abnormal condition, such as shorts and fires can be avoided. In addition, when the temperature of the first conductive sheet 122a is back below the second determined temperature, the second thermal cut-off device 124 can communicate the power transmission between the first conductive sheet 122a and the first power input wire 123a. The design of the second thermal cut-off device 124 can vary according to needs, and the instant disclosure is not limited thereto.

In accordance with the instant embodiment, in use of the power strip 1, when the temperature of the plugging face S1 is rising caused by the accumulated heat resulted from the abnormal plugging or from the overloading, through the first thermal sensing pin 1141 exposed on the plugging face S1 for timely sensing the temperature of the plugging face S1, the power strip 1 can timely cut off the power transmission between the power plug 11 and the outlet 12 through the first thermal cut-off device 114. Furthermore, the first thermal cut-off device 114 disposed inside the main body 111 of the power plug 11 and the second thermal cut-off device 124 disposed inside the main body 121 of the outlet 12 enable the power strip 1 to have two thermal cut-off mechanisms independent from each other, such that abnormal conditions, such as shorts and fires resulting from the accumulated heat, can be effectively avoided.

Moreover, in accordance with the above mentioned embodiment, the power strip 1 can have both the first thermal cut-off device 114 disposed inside the main body 111 of the power plug 11 and the second thermal cut-off device 124 disposed inside the main body 121 of the outlet 12, and the instant disclosure is not limited thereto. In an alternative embodiment, the power strip 1 can have the first thermal cut-off device 114 disposed inside the main body 111 of the power plug 11 and have no thermal cut-off device disposed in the outlet 12, and vice versa.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A power strip, comprising:
a power plug having a plugging face and at least one power pin disposed on the plugging face, wherein the power plug includes a first thermal cut-off device disposed therein, the first thermal cut-off device has a first thermal sensing pin partially exposed from the plugging face, and the power plug is adapted to an external outlet; and
an outlet having at least one set of apertures and connected to the power plug through a power cord;
wherein the first thermal cut-off device is in electrically connection with a power output wire of the power plug, and when the first thermal sensing pin contacts a surface of the external outlet and the temperature of the plugging face exceeds a first determined temperature, the first thermal cut-off device cuts off the power transmission between the power plug and the outlet.

2. The power strip of claim 1, wherein the first thermal cut-off device communicates the power transmission between the power plug and the outlet when the temperature of the plugging face is below the first determined temperature.

3. The power strip of claim 1, wherein the power plug has an inner frame and a first conductive guide, the first thermal cut-off device is disposed onto the inner frame through the first conductive guide.

4. The power strip of claim 1, further comprising
a second thermal cut-off device disposed inside the outlet and electrically connected between a conductive sheet and a power input wire of the outlet, wherein the second thermal cut-off device has a second thermal sensing pin in contact with the conductive sheet, and when the temperature of the conductive sheet exceeds a second determined temperature, the second thermal cut-off device cuts off the power transmission between the conductive sheet and the power input wire.

5. The power strip of claim 4, wherein the second thermal cut-off device communicates the power transmission between the conductive sheet and the power input wire when the temperature of the conductive sheet is below the second determined temperature.

6. The power strip of claim 4, wherein the outlet has a second conductive guide disposed therein, and the second thermal cut-off device is disposed onto the conductive sheet through the second conductive guide.

7. A power plug adapted to an external outlet, comprising:
a main body having a plugging face and at least one power pin disposed on the plugging face; and a thermal cut-off device disposed inside the main body, wherein the thermal cut-off device has a thermal sensing pin partially exposed from the plugging face;

wherein the thermal cut-off device is electrically connected between the power pin and a power output wire of the power plug, and when the first thermal sensing pin contacts a surface of the external outlet and the temperature of the plugging face exceeds a determined temperature, the thermal cut-off device cuts off the power transmission between the power pin and the power output wire.

8. The power plug of claim 7, wherein the power plug has an inner frame and a conductive guide both disposed inside the main body, the thermal cut-off device is disposed onto the inner frame through the conductive guide.

* * * * *